Feb. 3, 1959  J. C. SCHLÖSSER  2,871,889
METHOD AND MEANS FOR THE AUTOMATIC
EXCHANGE OF WEFT COPS ON LOOMS
Filed Jan. 4, 1956  5 Sheets-Sheet 1
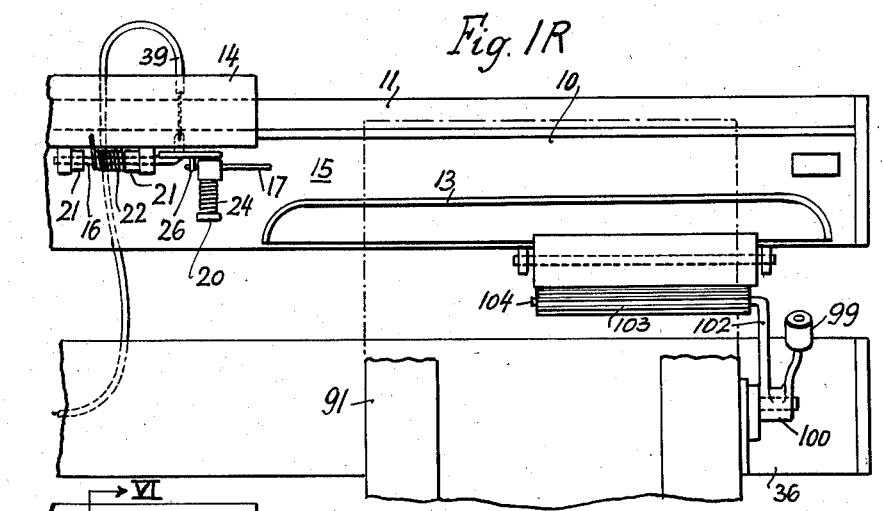
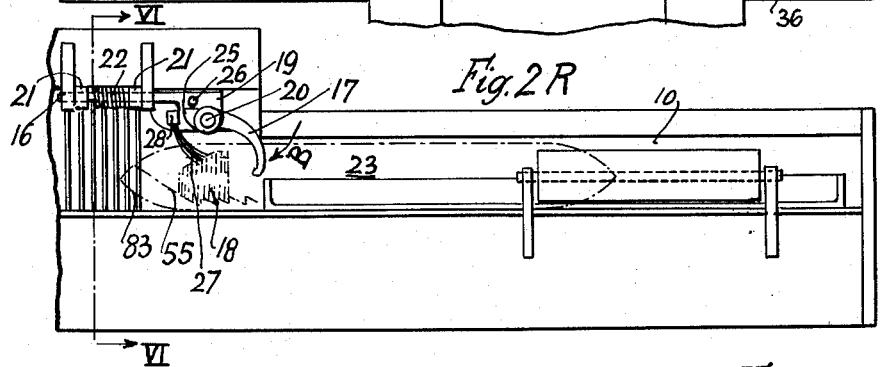
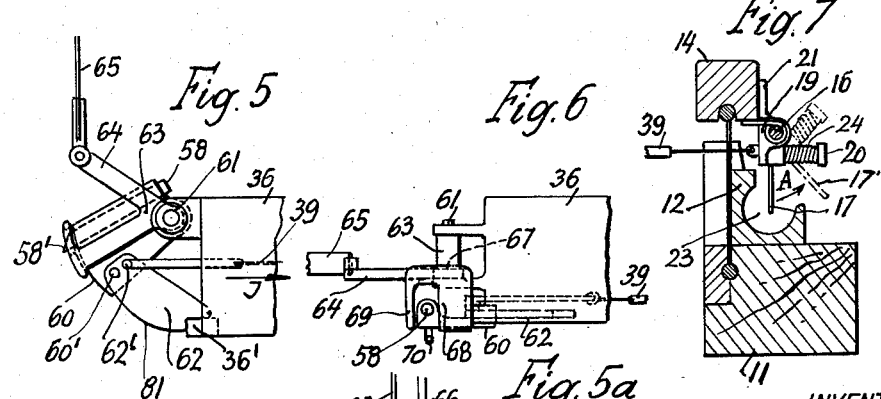
INVENTOR
JOHANN C. SCHLÖSSER
By Taulmin & Taulmin
Attorneys

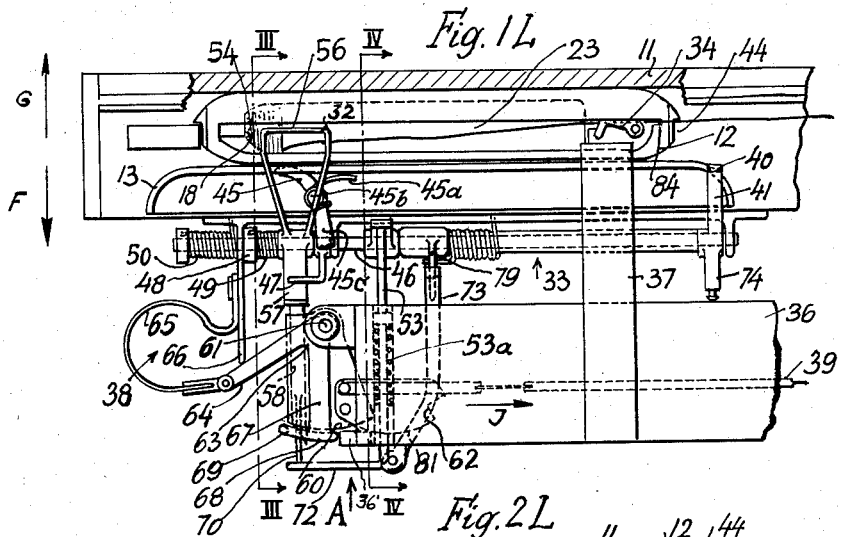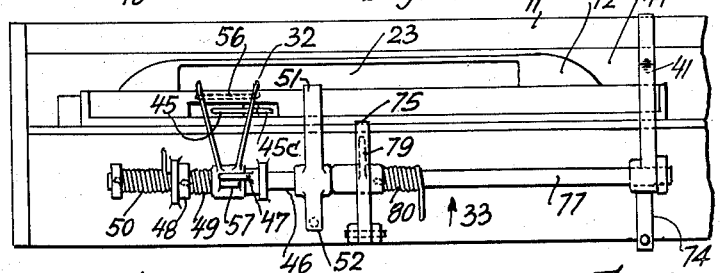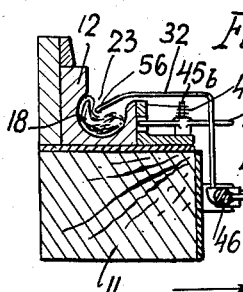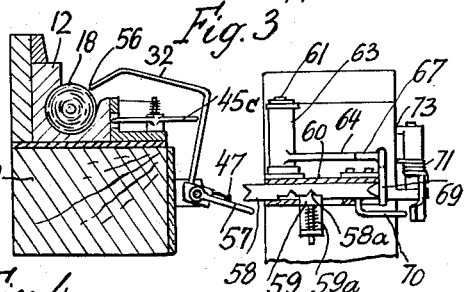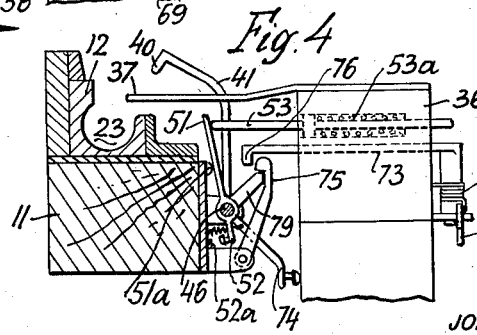

Feb. 3, 1959 J. C. SCHLÖSSER 2,871,889
METHOD AND MEANS FOR THE AUTOMATIC
EXCHANGE OF WEFT COPS ON LOOMS
Filed Jan. 4, 1956 5 Sheets-Sheet 3
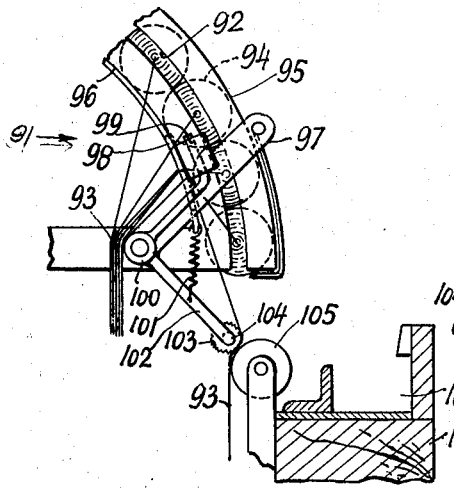
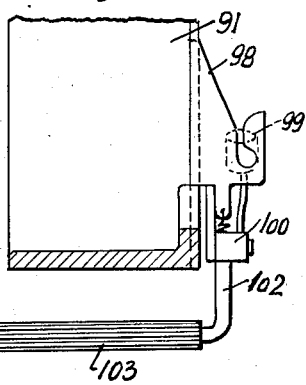
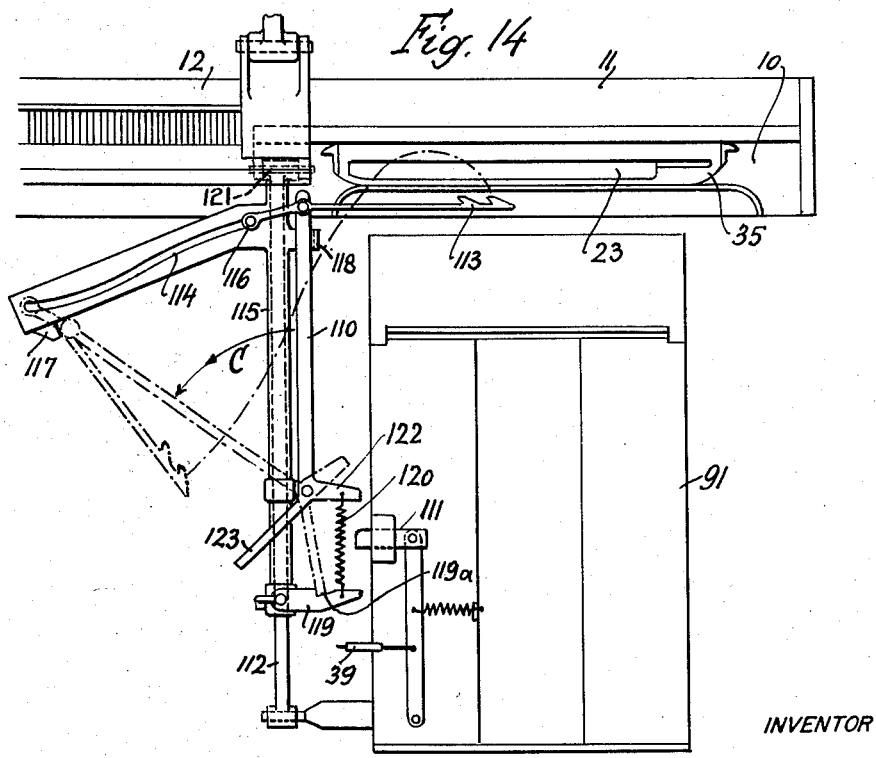
INVENTOR
JOHANN C. SCHLÖSSER
By Taulmin & Taulmin
Attorneys

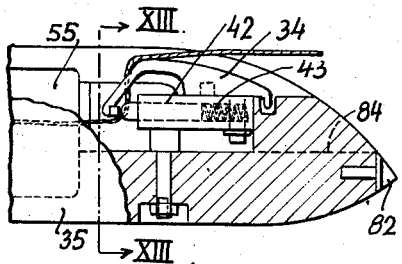
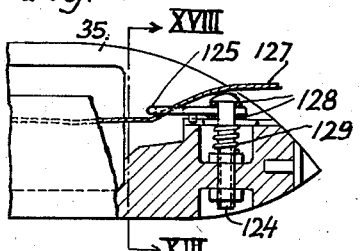
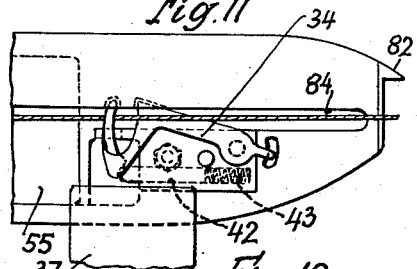
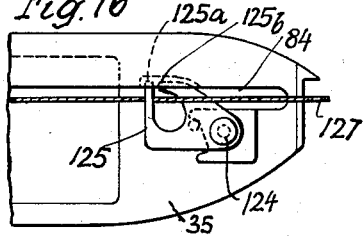
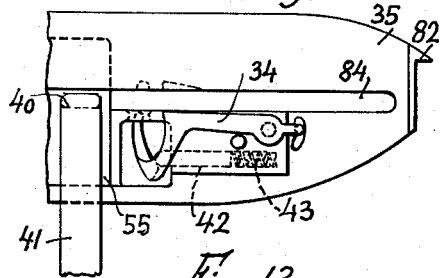
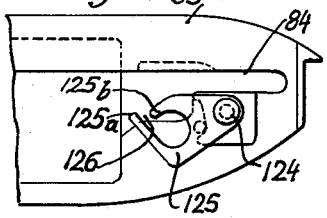
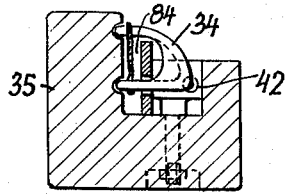
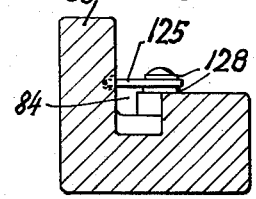

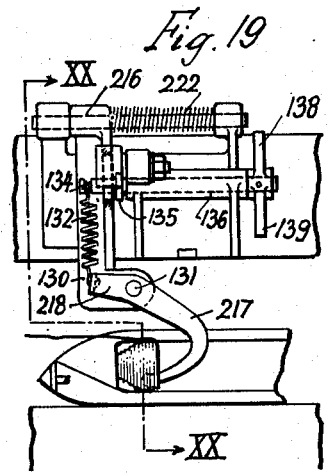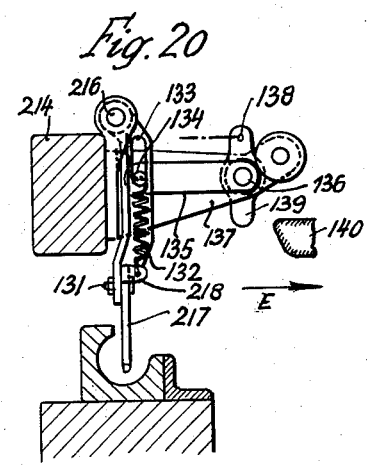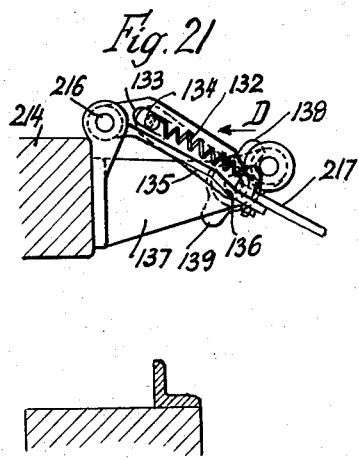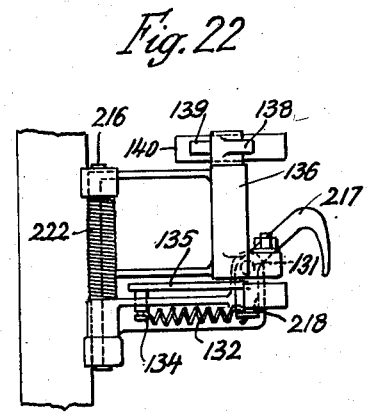
INVENTOR
JOHANN C. SCHLÖSSER

United States Patent Office 2,871,889
Patented Feb. 3, 1959

2,871,889

METHOD AND MEANS FOR THE AUTOMATIC EXCHANGE OF WEFT COPS ON LOOMS

Johann Clemens Schlösser, Bremen, Germany, assignor, by mesne assignments, to The De Laval Separator Company, Poughkeepsie, N. Y., a corporation of New Jersey Application January 4, 1956, Serial No. 557,360

Claims priority, application Germany January 15, 1955

24 Claims. (Cl. 139—241)

This invention relates to a method of and means for automatically changing weft cops on looms, wherein the disadvantages of similar arrangements already known in the art shall be eliminated.

On the known looms having an automatic weft cop exchanging device, wherein the weft yarn is drawn out of the center of a tubular cop or stationary spool placed in a single shuttle and the length of the cop decreases as the weft thread is reeled off, it is conventional to completely use up the weft threaded before introducing a fresh weft cop into the shuttle. The fresh cop is not introduced until the cop feeler and the weft feeler have detected the absence of the weft thread during a shoot. Consequently, during this shoot at least part of a thread is missing in the tissue, which deteriorates the quality of the goods.

Various methods have been proposed in the art to overcome this drawback, but they are all accompanied by new disadvantages.

One group of such known devices does not completely remove the rest of the weft cop, but leaves a thread in the shuttle, which extends from the ejector channel in the shuttle through its thread guide to the edge of the goods and enters the tissue on the next shuttle movement, whereby it forms a double weft together with the weft thread of the fresh cop.

Another group of such known devices is very complicated and costly in manufacturing and maintenance. Moreover, this kind of arrangement can be used only for one or a few linkages between the threads due to the fact that the shuttle necessarily carries out at least a few movements without a thread therein during the period between the old weft thread being out and the new weft thread being introduced, while the goods feed and the shoot guard must be arrested so as to avoid a missing weft in the tissue. However, this can easily lead to a thinner portion in the tissue due to the fact that the warp threads slacken slightly while the reel loops the lastly introduced weft thread several times. Furthermore, special gears are required always, depending on the number of empty shoots occurring in each specific case. The shuttles which must be specially constructed for this device have a short life due to the fact that its walls are weakened by openings for the passage of the weft cop rest ejector and the reception of the weft cop feeler mounted therein.

It is an object of the present invention to eliminate the drawbacks and disadvantages described hereinbefore, and to provide a device allowing an unobjectionable functioning of the automatic weft cop exchange without any interruption of the weaving process or speed reduction.

It is another object of this invention to provide a device that can be used for all kinds of linkages without requiring undesirable empty shoots, thereby eliminating the complicated and expensive shifting devices for different numbers of empty shoots otherwise required.

It is a further object of this invention to provide an automatic weft cop exchange which is specially advantageous for weaving scouring and scrubbing cloth.

It is yet another object of the invention to provide means for replacing the rest of the weft cop in the shuttle by a fresh weft spool while avoiding double wefts or partial wefts.

Another object of the invention is to provide a better thread and drawing-off device and a new design of the ejector as well as a special construction and arrangement of the weft cop feeler on the sley or batten, wherein said weft cop feeler cooperates with a shifting device provided on the loom frame in such a manner that the shifting device requires no individual drive, while said feeler has more time to detect the rest of the weft cop, thus working more sensitively, and is adjustable to the conditions prevailing in each loom.

Still another object of the invention is to provide such described means of simple and low-priced construction requiring no undesirable weakening of the shuttle due to additional openings required apart from the weft cop thread hole.

The aforesaid objects are obtained by the method and device according to the invention wherein a characteristic feature consists in that an ejector is caused to penetrate, at determined intervals, through the weft cop thread hole into the shuttle so as to remove the rest of the weft cap remaining therein after such intervals. Thereby it is possible to eject the remainder of the not completely consumed weft cop as well as to introduce the fresh weft cop during the period between the shuttle emerging from and again entering into the reel, without making a double weft. The ejector according to the invention is constructed in such a manner that it is prevented from becoming entangled with the thread, so that the remainder of the consumed weft cop is safely thrown out to one side of the loom.

Another feature of the invention consists in the manner in which the threading device of the shuttle is opened to release the old and introduce the new thread. This is of great importance for an unobjectionable exchange and for the complete removal of the weft cop rest at a time when the weft thread still reaches to the edge of the goods. It is of special advantage that a spring catch is provided for arresting the threading device in open as well as in closed position, an essential feature being that the threading device is opened in dependance on the action of the weft cop feeler, preferably by means of a spring-urged arm which, after being released from its detent by the weft cop feeler, swings into the shuttle path, or, in a special embodiment of the invention, the threading device is opened by the ejector hook itself.

Furthermore, in order to allow the weft cop exchange without an interruption of the weaving process, it is of advantage that when the sley or batten of the loom moves forward, the threading device can be closed by buffers provided on the loom frame, and the arm to open said threading device as well as the ejector itself can be brought into rest position.

A special embodiment of the threading device of a simple and less expensive construction permits its actuation when opened by the ejector hook in a manner which insures a safe release of the thread already at the front end of the shuttle.

The invention can be realized in different ways. Its nature will be still more clearly understood from the description of an example given hereinafter in connection with the accompanying drawings, in which:

Figs. 1–L and 1–R are a schematical interrupted plan view of the left and right sides, respectively, of the front part of a loom and its sley at its foremost dead center, wherein the central part comprising the shed has been omitted;

Figs. 2–L and 2–R are an interrupted front view of the left and right sides, respectively, of the sley shown in Figs. 1-L and 1-R, wherein the front part of the loom frame has been omitted;

Fig. 3 is a sectional view taken along the line III—III in Fig. 1-L, with the weft cop feeler in contact with an unconsumed weft cop in the shuttle;

Fig. 3a is a sectional view similar to Fig. 3, but with the weft cop feeler penetrating into the shuttle and compressing the weft cop rest;

Fig. 4 is a sectional view taken along the line IV—IV in Fig. 1-L;

Fig. 5 is a plan view of the shifting mechanism in a different position on the left part of the loom frame shown in Fig. 1-L;

Fig. 5a illustrates the shifting mechanism shown in Fig. 5 in an intermediate position between that shown in the latter figure and that of Fig. 1-L;

Fig. 6 is a front view indicated by arrow VI in Fig. 1-L on the left side of the loom frame;

Fig. 7 is a sectional view of the ejector device along line VII—VII in Fig. 2-R;

Fig. 8 is an end view of the thread-end draw-off device for the weft cop magazine at the right-hand part of the loom frame shown in Fig. 1-R;

Fig. 9 is a front view of the device shown in Fig. 8;

Fig. 10 is a partial sectional view of the shuttle with the threading device;

Fig. 11 is a horizontal plan view of Fig. 10;

Fig. 12 shows the same view as Fig. 11, but with the threading device open;

Fig. 13 is a sectional view along line XIII—XIII in Fig. 10;

Fig. 14 is a plan view of another embodiment of the ejector;

Fig. 15 is another embodiment of the threading device provided on the shuttle, wherein the shuttle is shown in a partially sectional view;

Fig. 16 is a horizontal plan view of Fig. 15 with the yarn threaded in;

Fig. 17 is a horizontal plan view of the embodiment of a threading device shown in Fig. 15 but in open position;

Fig. 18 is a sectional view along line XVIII—XVIII in Fig. 15;

Fig. 19 is a front view of another embodiment of the actuating device for the ejector;

Fig. 20 is a sectional view along line XX—XX in Fig. 19 of the sley with the ejector in working position in the shuttle;

Fig. 21 shows the ejector device in rest position, after the shuttle has passed the ejector;

Fig. 22 is a horizontal plan view of Fig. 21.

Referring now to the drawings more in detail and more particularly to Fig. 1 (L and R), reference numeral 10 designates the shuttle box of a sley 11 of a loom or automatic machine, into which the shuttle 12 (shown in Fig. 1-L) enters with the aid of guide means 13. The sley carries out the conventional forward and backward reciprocating movement by means of a lever system (not shown), forward movement being indicated by arrow F, and backward movement by arrow G (in Fig. 1-L). On the sley lid 14, above the entrance 15 to the shuttle box 10, there is provided a rotatable ejector shaft 16 substantially parallel to the direction of woof of the shuttle, to which shaft the ejector hook 17 (17′) for ejecting the weft cop nut 18 from the shuttle 12 is attached with the aid of an ejector plate 19 having a pivot 20 about which the ejector hook 17 can be pivotally displaced.

The ejector plate 19 is rigidly mounted on one end of the ejector shaft 16 and can be rotated together with the latter in bearings 21.

A torsion spring 22 urges the ejector plate 19 in a direction out of the interior of the weft cop chamber 23 of the shuttle 12, as indicated by the arrow A in Fig. 7.

A second torsion spring 24 mounted on the same pivot 20 as the ejector hook 17 urges the latter in the direction indicated by an arrow B in Fig. 2 (right section R), so as to cause the nose 25 of the hook 17 to come to rest against the lock pin 26.

On the left side of the loom (shown in Fig. 1-L) there are provided on the sley 11 the weft cop feeler 32 and an opening device 33 for opening the threading device 34 of the shuttle 12.

The opening device 33 of the threading device 34 of the shuttle 12 is of such construction that it opens the threading device 34 by means of the lug 40 on the long lever 41 and closes the same by means of a stop 37 on the loom frame 36. The threading device is arrested by the bolt 42 provided with a spring 43.

On the same side, on the front part of the loom frame 36, there is provided the shifting device 38 which carries out the follow actions: (a) feeling the weft cop (whereupon the opening device 33 opens the threading device 34), (b) causing the weft cop rest ejector 17 to enter the weft cop chamber, (c) lifting the pusher for the weft cop exchange, and (d) releasing the various devices for return into their initial positions under the action of their proper weight or springs provided for this purpose. The shifting device 38 is connected to the cop exchange device 91, which will be explained in detail later, and to the weft cop rest ejector 17 by means of Bowden cables 39, or levers, rods and the like.

When, after arriving in the left-hand shuttle box 44, the shuttle 12 comes to a stop at the left end position of its path of travel, it pushes a small spring-urged angular lever 45 outwardly, i. e. toward the adjacent end of the sley 11 by pivoting the same against the pressure of spring 45a about the pivot 45b, while the other arm 45c of this angular lever 45 releases the weft cop feeler 32 to enter the shuttle 12 provided said shuttle 12 has fully entered the shuttle box 44. Fig. 3 shows the weft cop feeler 32 held by the arm 45c of lever 45 outside the shuttle, its end being in contact with the full cop 18. In Fig. 3a, however, lever arm 45c has released feeler 32 and since the same is in contact with a yielding weft cop rest 18, it compresses the same and penetrates into the interior of shuttle 12.

The weft cop feeler 32 is hingedly arranged on the feeler shaft 46 which is mounted on the sley 11. This feeler shaft 46 may also be adapted to simultaneously actuate a center shoot guard of known construction (not shown). Furthermore, it carries the stop 47 for the weft cop feeler 32. The set collar 48 bearing the adjustable spring 49 presses the weft cop feeler 32 against the stop 47, while the return spring 50 keeps the shaft 46 with the weft cop feeler 32 and other parts described in neutral position or returns these parts into the latter position. (See Figs. 1-L, 2-L and 4.) Furthermore, an operating lever 51 is rigidly connected to the feeler shaft 46 and contacts in its rest position, by means of its stop 52, the sley 11 at 52a. (See Fig. 4.)

When the sley 11 approaches its foremost dead center in its movement forward in the direction of arrow F (see Figs. 3a and 4), the operating lever 51 of the weft cop feeler 32 comes into contact with the spring-urged stop bolt 53 mounted in the loom frame 36, said bolt 53 giving way against the pressure of spring 53a, with the operating lever 51 being pushed right home against the stop 51a. Thereby the operating lever 51 turns the feeler shaft 46 as the sley 11 moves forward in the direction of arrow F, while the feeler shaft 46 turns the adjustable spring 49 and the latter, in turn, turns the feeler 32 as long as said feeler 32 finds no resistance by the cop 18 in the weft spool chamber 23.

As long as the shuttle 12 has not yet completely entered the shuttle box 44, the feeler 32 is retained by the angular lever 45. If the weft cop in the weft cop chamber 23 is not yet used up to a determined weft cop rest 18, the weft cop will retain the feeler 32 in the position shown in Fig. 3, even when the shuttle 12 reaches its left end position in the shuttle box 44, the result being only an increase in the tension of the adjustable spring 49. The return spring 50, whose tension is also increased, causes all parts of the feeling device to return into their initial position as the sley 11 moves in the direction of arrow G.

As soon as the weft cop is used up, leaving only the determined cop rest 18, the remaining windings on the weft cop rest 18 yield to the pressure exercised on them by the weft cop feeler 32 so that the latter is allowed to penetrate the weft cop chamber 23 (see Fig. 3a).

The weft cop feeler 32 is preferably of the stirrup type and made, for instance, of steel wire. It has a long front section 56 for contact with the weft cop and possesses a short pusher 57 directed toward the shifting device 38, which pusher is raised when the feeler 32 protrudes into the weft cop chamber 23, i. e. from the position in Fig. 3 to that shown in Fig. 3a, until said feeler 32 arrives with its front edge on a common level with the bar 58 of the shifting device 38 and pushes said bar from the position in Fig. 3, where its notch 58a registers with the catch 59, to the position shown in Fig. 3a, where catch 59 registers with the notch 58b, as the sley 11 advances. The bar 58 is further provided with a slanting edge 58' at its one end (Figs. 5 and 5a).

The bar 58, which is thus held either in positions 58a or 58b by the catch 59, provided with spring 59a, is guided in the segment lever 60 which, in turn, is hingedly mounted on the shaft 61 and connected to the weft cop changing device 91 and the rest ejector 17 through the notched lever 62 and Bowden cables 39, or rods, or the like. (See Figs. 1, 3a, 5 and 6.)

The notched lever 62 is pivotally mounted on pivot 60' which is borne by segment lever 60. The notched lever 62, in turn, bears a pivot 62 to which one end of the Bowden cable 39 is fastened, thus subjecting the lever 62 continuously to a pull in the direction of arrow J.

The shaft 61 also carries the double-arm shifting lever 63 hinged on this shaft independently of lever 60, whose one arm 64 is attached at its free end to the sley 11 by means of the leather belt 65, or by a link chain, traction spring, or the like, and is thereby turned about a certain angle, depending on the length of the belt 65, as the sley 11 moves in the direction of arrow G, pulling this lever 63 in clockwise rotation about shaft 61 from its position in Fig. 1–L to that shown in Fig. 5. In this position the bolt 58 is advanced to have its end bearing the slanting edge 58' protrude, so that the driver 68 of the shifting lever 63 engages this end of bolt 58 and causes it, and together therewith the segment lever 60 to follow the clockwise movement of lever 63.

In its clockwise displacement about shaft 61, segment lever 60 also causes notched lever 62 to be displaced in following the displacement of the pivot 60' together with segment lever 60 on which it is mounted, the notched lever 62 moving from its position in Fig. 1–L to that shown in Fig. 5. Due to the pull of Bowden cable 39 exercised on pivot 62' on lever 62, the latter is also displaced simultaneously in clockwise rotation about pivot 60', and comes to rest against the stop 36' provided on the loom frame 36.

When the sley 11 moves forward in the direction of arrow F (Fig. 1–L), its long nose 66 pushes against arm 64 of shifting lever 63 and causes the latter to return from the position of Fig. 5 to its initial position shown in Fig. 1–L. As arm 67 of lever 63 and together therewith the driver 68 and a set-back 69 borne by arm 67 follow this return movement of lever 63, set-back 69 contacts the slanted surfaces 58' of bolt 58 and pushes the latter back into the segment lever 60. The latter lever thus remains in its position as adopted in Fig. 5 while the double-arm lever 63 passes over the segment lever in counterclockwise rotation about shaft 61 (see Fig. 5a).

As is shown in Fig. 5a, the driver 68 of arm 67 of lever 63, then contacts, during further rotation of the latter lever about shaft 61, the cam surface 81 of notched lever 62 and lifts the same from the stop 36'.

Thereupon, under effect of pull from the Bowden cable 39, segment lever 60 will also follow the counterclockwise movement of the other parts and shift from the position shown in Fig. 5 back to that illustrated in Fig. 1–L.

There is also provided on the bar 58 a small finger 70 for acting on the arm 72 of double-arm lever 72, 73 held in neutral position by a spring 71, which double-arm lever 72, 73 releases with its nose 76 the opening device 33 so as to open the threading device 34 of the shuttle 12 in the manner described below. Apart from the already described members, this opening device 33 further comprises a sleeve 77 independently rotatably mounted on the extended feeler shaft 46, as well as a locking lever 79, which cooperates with the latch 75, the long lever 41 having a nose 40 and an opposite tension lever arm 74 which forms a rigid angle with lever 41 (see Fig. 1–L). When the sley 11 is in its foremost dead center of the movement in the direction of arrow F, the opening device 33 is tensioned by the tension lever 74 engaging the loom frame 36, and is held in this position by the latch 75 passing over the locking lever 79 (see Fig. 4.)

By the displacement of the bar 58 and its finger 70, the long arm 73 of the double-arm lever 72, 73 with its nose 76 is swiveled into a position (Fig. 4) whereby it can engage the latch 75 when the sley 11 begins its return movement in the direction of arrow G, whereby the latch 75 is caused to release the locking lever 79. Consequently, the long arm 41 with its lug 40 is swiveled under the action of a spring 80, mounted on shaft 46 into engagement with the threading device 34 of the shuttle 12, and opens the same as the shuttle 12 is displaced.

During the further return movement of the sley 11, the driver 68 of the shifting lever 63 simultaneously carries the segment lever 60 and the bar 58, as well as the notched lever 62 along with it, pulling against the Bowden cable 39, until these parts reach again the position shown in Fig. 5. In the rearmost position of the sley 11, the notched lever 62 is arrested by the stop 36' to hold the entire unit in this position until, during the subsequent forward movement, the parts function in the manner set forth above in describing in particular Fig. 5a.

Proceeding now to describing parts on the right hand side of the loom (see Fig. 1–R), the weft cop changing device 91 is provided laterally throughout its length with a slot 92 for the thread ends 93 of the weft cops 94 and is arranged, for instance, on the right hand side of the loom (Fig. 8) with the thread ends 93 freely hanging by 20 to 30 centimeters downwardly from the slot 92. This slot 92 is formed between the top part 95 and the bottom part 96 of the weft cop changing device 91 and bridged to support the top part 95 by means of arms 97 which are, however, so devised that they do not catch the thread ends 93 or divert them from the slot 92. At the lower end of the slot 92, there is provided a self-threading thread holding device 98, which comprises a clamping roller 99 on a hinged twin lever 100 for the thread ends 93, this clamping device being opened by the stop of the sley 11 and closed by the tension spring 101. The lower arm 102 of the twin lever 100, in turn, forms a part of the draw-off device for the clamped thread ends 93, which arm 102 is provided with an angular portion 104 which is disposed parallel to the sley 11 and covered with the ribbed jacket 103. Facing this angular portion 104, there is provided a roller 105 of wood, rubber, or like material arranged on the sley 11. When the sley 11 moves forward, the roller 105 engages the angular portion 104 of the twin lever 100 and carries the same with it against the action of the spring 101. The clamping roller 99 is now opened, while the thread end 93 gripped by the same can now be drawn out of the thread holding device 98 (Fig. 8).

On the right hand side of the loom (Fig. 1–R), the

Bowden cable 39, when being pulled, actuates in a known manner, a pusher 91a of the above-mentioned weft cop changing device 91 and swivels the weft cop rest ejector 19 into its working position by rotation about the shaft 16 so that the ejector 19 protrudes with its spring-urged hook 17 into the path of travel of the shuttle 12.

When the shuttle 12, coming from the left hand shuttle box 44, enters the right hand shuttle box 10, its tip 82 slightly raises the hook 17, which hook drops back immediately into the interior of the weft cop chamber and remains in this position while the entire weft cop chamber 23 passes by until the hook 17 seizes the weft cop rest 18 as the shuttle 12 proceeds to its right hand dead center. The weft cop chamber 23 at the rear end 83 of the shuttle 12 has a beveled surface 55 so that the hook 17, with the weft cop rest 18 on it, is raised and hence removes the weft cop rest 18 from the shuttle 12 (Fig. 2–R).

As the sley 11 now approaches its right hand dead center, the weft cop changing device 91 introduces a fresh weft cop 94 into the shuttle 12, in a manner and by means well known in the art.

At some distance from the right hand dead center, the driver 68 of the shifting lever 63 releases the notched lever 62 on the segment lever 60 and under the action of the Bowden cable 39 attached to lever 62, the spring 22 causes the weft cop rest ejector 17 to return to its inoperated position, whereby the weft cop rest 18 is flung off from the hook 17. An elastic stripper 27, such as, for instance, a bundle of bristles which co-operates with the hook 17, may be adjusted in its holder 28 to fling the weft cop rest 18 off in a desired direction, thereby insuring that the weft cop rest 18 is not flung into the shuttle race.

Then the shuttle 12 returns through the shuttle race to the left hand shuttle box 44, while the weft thread of the fresh weft cop enters into the slot 84 of the threading device 34 (Fig. 11). As the sley 11 approaches the foremost dead center in its movement in the direction of arrow F, the stop 37 on the loom frame 36 closes the threading device 34 (Figs. 1–L and 11), and the weft thread is prevented from unthreading.

At this stage, the weft cop rest 18 still is connected to the edge of the goods and so is the initial thread end 93 of the newly introduced weft cop 94, which thread end extends from the thread holding device 98, 99 on the weft cop changing device 91 (Fig. 8) to the edge of the goods. Both threads are cut off after a few shoots by a shearing device (not shown) of known construction provided at the edge of the goods. The weft cop rest 18 drops into a container. The thread end 93 arrives with its part hanging down between the draw-out device 103, 105, which, after a few further shoots, draws it entirely out of the thread holding device 98, 99 and drops it on the floor.

A different embodiment of the weft cop rest ejector is shown in Fig. 14. This embodiment provides that the weft cop rest 18 is removed by a hook 113 after the shuttle 12 has come to a standstill in the shuttle box 10. This hook 113 is moved by means of the cam 114 and the catapult lever 110, said hook flinging the weft cop rest 18 away. In this case, the weft cop rest ejector is arranged as follows: The sley 11 or, in the case of looms having the batten at the top, the picker spindle carrier, is provided with a support for the weft cop rest ejector, wherein the latter is rotatably mounted. Thereby, the ejector is caused to follow the movement of the sley 11.

A guide rod 112 is rotatably mounted on the weft cop changing device 91, which rod moves telescopically in the guide tube 115 of the weft cop rest ejector as the sley is reciprocated.

This guide tube 115 carries the catapult lever 110 with the ejector hook 113 and the guide roller 116, furthermore a cam race 114 with the stops 117, 118 for the catapult lever 110 at its upper end, the locking lever 119 with the return spring 120 and, at its lower end, the bearing bolt 121 for the sley 11.

This catapult lever 110, has a long arm, the lower end of which is provided with the ejector hook 113 which is always above the shuttle box 10 while the loom is in operation. Furthermore, the catapult lever 110 has at its lower end, short arm 122 to which there is attached one end of the return spring 120 whose other end is attached to the locking lever 119 and the catch lever 123. The catch lever 123 also extends from the lower end of lever 110 for engagement with the locking lever 119.

On the stationary weft cop changing device 91, there is arranged a displaceable stop 111, which may be shifted to its working position, i. e. into the path of travel of the short arm 122 of the catapult lever 110 and of the locking lever 119 by means of the shifting device 38 through a Bowden cable 39, or rods or the like.

If the shifting device 38 (Fig. 1–L) has shifted the displaceable stop 111 into its working position, the short arm 122 of the catapult lever 110 contacts the displaceable stop 111 as the sley 11 moves forward in the direction of arrow F toward its foremost dead center and the shuttle 12 lies arrested in the shuttle box 10. As the sley 11 continues its movement, the catapult lever 110 is swiveled in the direction of the arrow C. The ejector hook 113 follows this swiveling movement of the catapult lever 110 and is guided by the guide roller 116 positively following the cam 114, to move in such a manner that it seizes the weft cop rest 18 in the shuttle 12, removes the same from the shuttle and flings it off as soon as the catapult lever 110 contacts the stop 114a.

Moreover, due to this movement of the catapult lever 110, the catch lever 123 is inserted into a notch 119a of the safety lever 119, whereby the catapult lever 110, together with the ejector hook 113, are arrested while a fresh weft cop 94 is introduced into the shuttle 12 while the sley 11 is in its foremost position and also during the subsequent return movements of the sley, until the locking lever 119 contacts the displaceable stop 111, which lifts the same and thus releases the catch lever 123. This occurs shortly prior to the sley 11 reaching the end position of its return movement in the direction of arrow G when the shuttle 12 has definitely left the shuttle box 10, in order to prevent the ejector hook 113 from obstructing the travel of the shuttle 12 as the sley 11 returns. Thereupon, the displaceable stop 111 is returned to its inoperative position and the weaving process can proceed.

In Figs. 10 to 13, I have illustrated a threading device for a shuttle which can be opened and closed during the process of weaving. Opening for unthreading is effected by lever 41 with nose 40 (Fig. 4) or by the ejector hook 17 (Fig. 7) or 217 (Figs. 19–22). The threading device is closed by stop piece 37 (Fig. 1–L). The threading lever 34 is pivotable and is kept in "open" or "closed" position by a spring bolt 42 and spring 43 (Figs. 11 and 12).

Figs. 15 to 18 show a threading device that is opened by the ejector in its working position. For this purpose, the threading device is devised as a loop-shaped lever 125, which turns horizontally, due to friction, about the bolt 124 of the shuttle 35, said lever having a threading slot 126 for the thread 127. The one arm 125a of the loop-shaped lever 125 reaches past the other arm 125b at the opening 126, thereby insuring a positive seizure of the thread 127. Brake linings 128 (see Fig. 15) on the bolt 124 and the spring 129 are provided to keep the threading lever 125 in position by friction.

In order to unthread the thread 127, the threading device is actuated by the ejector 17 which, in its working position, protrudes into the shuttle.

Furthermore, stops may be provided for the two positions of the threading lever, i. e. once with the thread in and once with the thread out of the lever.

In the embodiments of the ejector shown in Figs. 19 to 22, the ejector lever 130 is rotatably mounted on the shaft 216 and carries at its free end a pivot 131 on which there is pivotally mounted the ejector hook 217 having a short arm 218 to which there is attached one end of the spring 132. The ejector lever 130 is further provided with a longitudinal slot 133 which displaceably houses the guiding pin 134 mounted on the free end of the actuating lever 135. This latter lever is pivotally mounted on a shaft 136 which is supported in the bracket 137. The latter is mounted, in turn, on the lid 214 of the sley of the loom. At the pin 134 there is attached the other end of spring 132. The shaft 136 carries at its end opposite lever 135 a lever 138 actuated by means of the Bowden cable 39 from the shifting device 38 (see Fig. 1–L). The lever 138 is provided with a buffer 139 by which it contacts breast beam nose 140.

When the lever 138 is pulled by means of the Bowden cable into the direction marked by the arrow D in Fig. 21, the ejector lever 130 is shifted to its working position shown in Fig. 20, so that the ejector hook 217 is lowered into the path of the shuttle. Simultaneously, the pin 134 in cooperation with the spring 132 and the slot 133 blocks the lever 130 in such a manner that it can be released only by the buffer 139 against the breast beam nose 140 when the sley moves forward in the direction of arrow E, at the same time causing the ejector device to return into its inoperative position wherein said lever 130 is detained by the spring 222.

It will be understood that this invention is susceptible to further modification and, accordingly, it is desired to comprehend such modifications within this invention as may fall within the scope of the appended claims.

What is claimed is:

1. In an automatic weft cop exchanging device for use with looms having at least one shuttle for reciprocatory movement across said loom, a weft cop chamber in said shuttle for housing a weft cop therein to be consumed up to a determined weft cop rest which is to be ejected, and an opening in said shuttle for the passage of a weft thread from said cop to the edge of the goods on the loom; the improvement comprising ejector means for ejecting said weft cop rest from said shuttle, said means being adapted to penetrate into the interior of said chamber during the reciprocatory movement of said shuttle each time said weft cop is consumed up to said determined rest.

2. In an automatic weft cop exchanging device for use with looms having at least one shuttle for reciprocatory movement across said loom, a weft cop chamber in said shuttle for housing a weft cop therein to be consumed up to a determined weft cop rest which is to be ejected, and an opening in said shuttle for the passage of a weft thread from said cop to the edge of the goods on the loom; the improvement comprising ejector means for ejecting said weft cop rest from said shuttle, said means being adapted to penetrate into the interior of said chamber during the reciprocatory movement of said shuttle each time said weft cop is consumed up to said determined rest, said ejector means comprising an ejector plate, an ejector hook pivotally mounted on said plate, and resilient means for permitting said hook to yield in a single direction of travel of said shuttle.

3. In an automatic weft cop exchanging device for use with looms having at least one shuttle for reciprocatory movement across said loom, a weft cop chamber in said shuttle for housing a weft cop therein to be consumed up to a determined weft cop rest which is to be ejected, and an opening in said shuttle for the passage of a weft thread from said cop to the edge of the goods on the loom; the improvement comprising ejector means for ejecting said weft cop rest from said shuttle, said means being adapted to penetrate into the interior of said chamber during the reciprocatory movement of said shuttle each time said weft cop is consumed up to said determined rest, said ejector means comprising an ejector plate and an ejector hook mounted on said ejector plate and adapted for rotation about an axis substantially parallel to the direction of travel of said shuttle across said loom.

4. In an automatic weft cop exchanging device for use with looms having a sley, a sley lid, at least one shuttle race in said sley, a first shuttle box at one end of said shuttle race, and a second shuttle box at the opposite end thereof, at least one shuttle for reciprocating movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising ejector means disposed at said first shuttle box for ejecting said weft cop rest from said shuttle, which means comprise an ejector shaft mounted on said sley lid substantially parallel to said shuttle race, an ejector plate horizontally mounted on said shaft, and an ejector hook pivotally mounted on said plate, a weft cop feeler disposed at said second shuttle box and adapted to feel said weft cop in said weft cop chamber through said shuttle opening, and control means for causing said hook to penetrate into the interior of said chamber during the reciprocating movement of said shuttle, said feeler causing said control means to actuate said ejector means each time said weft cop has been consumed up to said determined rest.

5. The improvement as described in claim 4 wherein said control means comprises at least one Bowden cable.

6. The improvement as described in claim 4 wherein said control means comprises a lever mechanism.

7. The improvement as described in claim 4, further comprising a resistant stripping means for cooperation with said ejector hook, said stripping means being mounted on said ejector plate adjacent said ejector hook toward the left shuttle box.

8. The improvement as described in claim 7, wherein said stripping means is a brush.

9. In an automatic weft cop exchanging device for use with looms having a loom frame, a sley, a sley lid, at least one shuttle race in said sley, a first shuttle box at one end of said shuttle race and a second shuttle box at the opposite end thereof, at least one shuttle for reciprocatory movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising ejector means disposed at said first shuttle box for ejecting said weft cop rest from said shuttle, which means comprise an ejector shaft mounted on said sley lid substantially parallel to said shuttle race, an ejector plate hingedly mounted on said shaft, and an ejector hook pivotally mounted on said plate; and steering means for causing said hook to penetrate into the interior of said chamber during the reciprocatory movement of said shuttle each time said weft cop has been consumed up to said determined rest, said steering means comprising a weft cop feeler disposed at said second shuttle box and adapted to feed said weft cop in said weft cop chamber through said shuttle opening and to change its position by penetrating into said chamber when said weft cop is consumed up to said determined rest.

10. In an automatic weft cop exchanging device for use with looms having a loom frame, a sley, a sley lid, at least one shuttle race in said sley, a first shuttle box at one end of said shuttle race and a second shuttle box at the opposite end thereof, at least one shuttle for reciprocatory movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising a threading device on said shuttle for guiding said thread from said opening to said goods, said threading device being adapted to be opened and closed, and a catch spring means for arresting said threading device in its open as well as in its closed position.

11. In an automatic weft cop exchanging device for use with looms having a loom frame, a sley, a sley lid, at least one shuttle race in said sley, a first shuttle box at one end of said shuttle race and a second shuttle box at the opposite end thereof, at least one shuttle for reciprocatory movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising ejector means disposed at said first shuttle box for ejecting said weft cop rest from said shuttle, a threading device on said shuttle for guiding said thread from said opening to said goods, said threading device being adapted to be opened and closed, a weft cop feeler disposed at said second shuttle box and adapted to feel said weft cop in said weft spool chamber through said shuttle opening, said feeler being operable to actuate said ejector means, and means for opening said threading device synchronously with said weft cop feeler actuating said ejector means.

12. In an automatic weft cop exchanging device for use with looms having a loom frame, a sley, a sley lid, at least one shuttle race in said sley, a first shuttle box at one end of said shuttle race and a second shuttle box at the opposite end thereof, at least one shuttle for reciprocatory movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising a threading device on said shuttle adjacent said opening therein, a weft cop feeler disposed at said second shuttle box and adapted to feel said weft cop in said weft cop chamber through said shuttle opening, means for arresting said weft cop feeler until said shuttle has completely entered said second shuttle box, an opening lever on said sley lid for opening said threading device, said lever being adapted to contact said threading device on said shuttle when said arresting means are caused to release said weft cop feeler.

13. In an automatic weft cop exchanging device for use with looms having a loom frame, a sley for reciprocating forwardly and backwardly in said loom, a sley lid, at least one shuttle race in said sley, a first shuttle box at one end of said shuttle race and a second shuttle box at the opposite end thereof, at least one shuttle for reciprocatory movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising a threading device on said shuttle adjacent said opening therein, an opening lever on said sley lid for engaging said threading device to open the same, and stop means on said loom frame for closing said threading device during the forward movement of said sley and for disengaging said opening lever from said threading device.

14. In an automatic weft cop exchanging device for use with looms having a sley, a sley lid, at least one shuttle race in said sley, a first shuttle box at one end of said shuttle race, and a second shuttle box at the opposite end thereof, at least one shuttle for reciprocating movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising ejector means disposed at said first shuttle box for ejecting said weft cop rest from said shuttle, which ejector means comprises a catapult lever, an ejector hook to be swung about by said catapult lever, a cam track guide for guiding said catapult lever so as to cause said ejector hook to penetrate into said shuttle, pull out said weft cop rest and fling the same off; a weft cop feeler disposed at said second shuttle box and adapted to feel said weft cop in said weft cop chamber through said shuttle opening, and stop means for actuating said catapult lever, said stop means being actuated by said feeler each time said weft cop has been consumed up to said determined rest.

15. In an automatic weft cop exchanging device for use with looms having a sley, a sley lid, at least one shuttle race in said sley, a first shuttle box at one end of said shuttle race, and a second shuttle box at the opposite end thereof, at least one shuttle for reciprocating movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising ejector means disposed at said first shuttle box for ejecting said weft cop rest from said shuttle, which ejector means comprises a catapult lever, an ejector hook to be swung about by said catapult lever, a cam track guide for guiding said catapult lever so as to cause said ejector hook to penetrate into said shuttle, pull out said weft cop rest and fling the same off; a weft cop feeler disposed at said second shuttle box and adapted to feel said weft cop in said weft cop chamber through said shuttle opening, stop means for actuating said catapult lever, said stop means being actuated by said feeler each time said weft cop has been consumed up to said determined rest; and means for arresting said catapult lever in its catapulting position.

16. In an automatic weft cop exchanging device for use with looms having a sley, a sley lid, at least one shuttle race in said sley, a first shuttle box at one end of said shuttle race, and a second shuttle box at the opposite end thereof, at least one shuttle for reciprocating movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising ejector means disposed at said first shuttle box for ejecting said weft cop rest from said shuttle, which ejector means comprises a catapult lever, an ejector hook to be swung about by said catapult lever, a cam track guide for guiding said catapult lever so as to cause said ejector hook to penetrate into said shuttle, pull out said weft cop rest and fling the same off; a weft cop feeler disposed at said second shuttle box and adapted to feel said weft cop in said weft cop chamber through said shuttle opening, stop means for actuating said catapult lever, said stop means being actuated by said feeler each time said weft cop has been consumed up to said determined rest; and means for arresting said catapult lever in its catapulting position, said arresting means releasing said catapult lever only after the sley has arrived in its backward position.

17. In an automatic weft cop exchanging device for use with looms having a sley, a sley lid, at least one shuttle race in said sley, a first shuttle box at one end of said shuttle race, and a second shuttle box at the opposite end thereof, at least one shuttle for reciprocating movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising ejector means disposed at said first shuttle box for ejecting said weft cop rest from said shuttle, a weft cop feeler disposed on said sley at said second shuttle box and adapted to feel said weft cop in said weft cop chamber through said shuttle opening, and a switching device adapted for cooperation with said weft cop feeler to allow said feeler to enter the weft cop chamber only when the shuttle is boxed.

18. In an automatic weft cop exchanging device for use with looms having a sley, a sley lid, at least one shuttle race in said sley, a first shuttle box at one end of said shuttle race, and a second shuttle box at the opposite end thereof, at least one shuttle for reciprocating movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising ejector means disposed at said first shuttle box for ejecting said weft cop rest from said shuttle, a weft cop feeler disposed on said sley at said second shuttle box and adapted to feel said weft cop in said weft cop chamber through said shuttle opening, spring means for urging said weft cop feeler to penetrate into said weft cop chamber, and a switching device adapted for cooperation with said weft cop feeler to allow said feeler to enter the weft cop chamber only when the shuttle is boxed.

19. In an automatic weft cop exchanging device for use with looms having a sley, a sley lid, at least one shuttle race in said sley, a first shuttle box at one end of said shuttle race, and a second shuttle box at the opposite end thereof, at least one shuttle for reciprocating movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising ejector means disposed at said first shuttle box for ejecting said weft cop rest from said shuttle, a weft cop feeler disposed on said sley at said second shuttle box and adapted to feel said weft cop in said weft cop chamber through said shuttle opening, and a switching device adapted for cooperation with said weft cop feeler, said switching device comprising a double-arm lever which arrests said weft cop feeler in a position outside said weft cop chamber when said left shuttle box is empty as well as during the passage of said shuttle through said left shuttle box before reaching its dead center therein.

20. In an automatic weft cop exchanging device for use with looms having a loom frame, a sley, a sley lid, at least one shuttle race in said sley, a first shuttle box at one end of said shuttle race and a second shuttle box at the opposite end thereof, at least one shuttle for reciprocatory movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising ejector means disposed at said first shuttle box for ejecting said weft cop rest from said shuttle, a threading device on said shuttle adjacent said opening therein, means for operating said threading device comprising a weft cop feeler disposed at said second shuttle box and adapted to feel said weft cop in said weft cop chamber through said shuttle opening, said feeler being operable to place said ejector means in operating position, and means for opening said threading device in response to said ejector means having been caused to adopt its operating position by said weft cop feeler.

21. In an automatic weft cop exchanging device for use with looms having a loom frame, a sley, a sley lid, at least one shuttle race in said sley, a first shuttle box at one end of said shuttle race and a second shuttle box at the opposite end thereof, at least one shuttle for reciprocatory movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising a threading device on said shuttle adjacent said opening, said threading device consisting of a pin in said shuttle, a loop-shaped lever pivotally mounted on said pin, said loop-shaped lever having two areas overlapping one another and leaving a gap therebetween for entering said weft thread therethrough into said threading device.

22. In an automatic weft cop exchanging device for use with looms having a loom frame, a sley, a sley lid, at least one shuttle race in said sley, a first shuttle box at one end of said shuttle race and a second shuttle box at the opposite end thereof, at least one shuttle for reciprocatory movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising a threading device on said shuttle adjacent said opening, said threading device consisting of a pin in said shuttle, a loop-shaped lever pivotally mounted on said pin, and a brake lining around said pin; said loop-shaped lever having two areas overlapping one another and leaving a gap therebetween for entering said weft thread therethrough into said threading device.

23. In an automatic weft cop exchanging device for use with looms having a loom frame, a breast beam, a sley, a sley lid, at least one shuttle race in said sley, a first shuttle box at one end of said shuttle race and a second shuttle box at the opposite end thereof, at least one shuttle for reciprocatory movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising ejector means disposed at said first shuttle box for ejecting said weft cop rest from said shuttle, said ejector means comprising an ejector shaft mounted on said sley lid, an ejector plate having an elongated slot therein, said plate being hingedly mounted on said shaft, an actuating lever adapted for shifting said ejector means from inoperative to working position and vice versa, said actuating lever engaging with its free lever end a pin adapted for reciprocation in said slot.

24. In an automatic weft cop exchanging device for use with looms having a loom frame, a sley, a sley lid, at least one shuttle race in said sley, a first shuttle box at one end of said shuttle race and a second shuttle box at the opposite end thereof, at least one shuttle for reciprocatory movement along said shuttle race between said first and second shuttle boxes, a weft cop chamber in said shuttle for housing a weft cop therein, which weft cop is to be consumed up to a determined weft cop rest which is to be ejected from said chamber, and an opening in said shuttle for the passage of a weft thread from said cop to the edge of the goods on the loom; the improvement comprising a threading device on said shuttle for guiding said thread from said opening to said goods, said threading device being adapted to be opened and closed, said threading device includes a lever pivoted for movement between open and closed positions, and a spring-pressed bolt coacting with said lever for holding the same alternately in said positions.

References Cited in the file of this patent

UNITED STATES PATENTS

| | | |
|---|---|---|
| 1,678,610 | Tebo | July 24, 1928 |
| 1,836,965 | Hannah | Dec. 15, 1931 |
| 2,123,266 | Wattie | July 12, 1938 |
| 2,681,666 | Moseley et al. | June 22, 1954 |

FOREIGN PATENTS

| | | |
|---|---|---|
| 157,480 | Australia | July 6, 1954 |
| 516,271 | Belgium | Jan. 15, 1953 |
| 632,245 | Great Britain | Nov. 18, 1949 |
| 661,751 | Great Britain | Nov. 28, 1951 |

UNITED STATES PATENT OFFICE

CERTIFICATE OF CORRECTION

Patent No. 2,871,889                                        February 3, 1959

Johann Clemens Schlösser

It is hereby certified that error appears in the above numbered patent requiring correction and that the said Letters Patent should read as corrected below.

In the heading to the printed specification, line 9, for the priority date, "January 15, 1955", read -- January 5, 1955 --; column 10, line 68, for "feed" read -- feel --; column 11, line 32, for "spool" read -- cop --; column 13, line 47, for "feeter" read -- feeler --.

Signed and sealed this 14th day of July 1959.

(SEAL)
Attest:

KARL H. AXLINE                                              ROBERT C. WATSON
Attesting Officer                                      Commissioner of Patents